L. H. MAYOTT.
Slide Gage.

No. 82,969.

Patented Oct. 13. 1868.

Witnesses

Inventor
LaFayette H. Mayott

LA FAYETTE H. MAYOTT, OF SPRINGFIELD, MASSACHUSETTS.

Letters Patent No. 82,969, dated October 13, 1868.

IMPROVEMENT IN GAUGES.

The Schedule referred to in these Letters Patent and making part of the same.

*To all whom it may concern:*

Be it known that I, LA FAYETTE H. MAYOTT, of Springfield, in the county of Hampden, and State of Massachusetts, have invented a new and useful Improvement in Slide-Gauges; and I declare that the following is a full and exact description thereof, reference being had to the accompanying drawings, and to the letters of reference thereon, the same being a part of this specification.

The nature of my invention consists in providing the gauge with a screw-nut, which turns upon a thread cut on the beam of the gauge, and is so connected with the slide as to carry the slide with it when it turns.

To enable others skilled in the art to make and use my invention, I proceed to describe its construction and operation.

Figure 2:
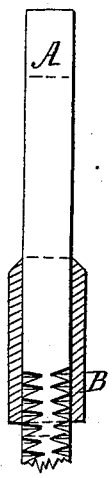
Figure 1:
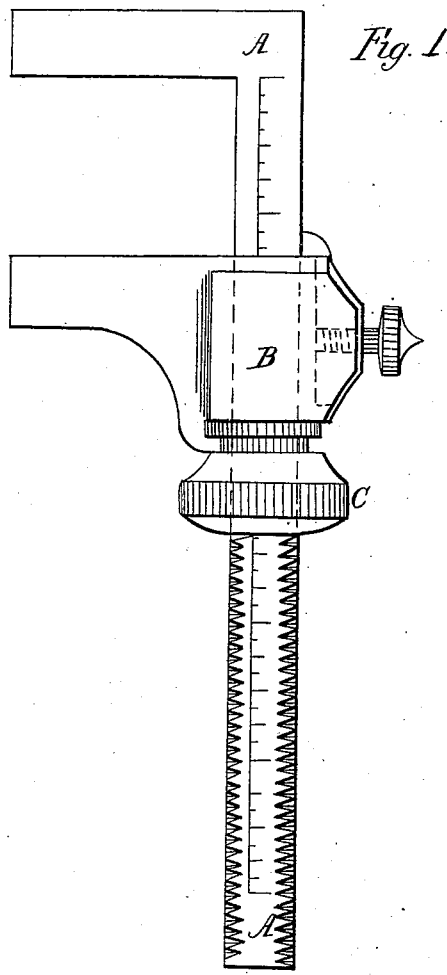
Figure 3:
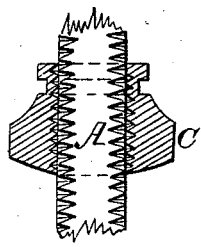

The gauge is made of the ordinary material and proportions. Upon the beam A A, as shown in Figure 1, is cut a thread, extending so far that the slide carried by the screw-nut turned upon the thread, may be pushed thereby to the stationary arm at the end of the gauge. A screw-nut, as shown in figs. 1 and 3, is fitted to the thread on the beam, and made of such size as to be readily turned between the thumb and finger of the operator, and with a lip at the end next the slide to fit into and turn in a groove in the slide, as shown in fig. 1; C being the screw-nut, and B the slide.

The lip of the screw-nut being inserted in the groove in the slide, when the slide is passed upon the beam, the operator brings the slide to the desired position upon the beam by turning the nut, and the slide being held fast by the lip in the groove, is pushed along before the nut, or drawn along behind the nut in its progress, as the operator turns the nut up or down upon the beam. The slide may be brought to the precise position wished, with greater accuracy and ease, by means of the screw-nut, than when moved by the direct action of the hand, and is less liable to slip out of position before fixed by the set-screw, because it can move only in accordance with the turning of the nut upon the beam.

I am aware that a beam, having a screw-thread cut thereon, and a nut for moving one jaw of the wrench, have been in public use; and also that gauges having a detached screw for driving one of the sliding arms are old, such a device being shown in the Letters Patent granted to A. S. Hosley, August 19, 1851, for ships'-model measurer, and to S. Whalen, December 26, 1865, for calipers; and I do not claim either of such constructions as of my invention, my invention being limited to the combination and arrangement of parts, substantially as hereinbefore set forth.

What I claim as new, and desire to secure by Letters Patent, is—

The construction and arrangement of the graduated beam A, having a thread cut thereon, in combination with the sliding arm B, and nut C engaging therewith, set-screw and stationary arm, the whole constituting an adjustable slide-gauge, substantially as described.

LA FAYETTE H. MAYOTT.

Witnesses:
A. L. SOULE,
W. B. ROGERS.